US012735596B2

(12) United States Patent
Fujii et al.

(10) Patent No.: US 12,735,596 B2
(45) Date of Patent: Sep. 15, 2026

(54) MANUFACTURING METHOD OF CONDUCTIVE LAYER

(71) Applicant: FUJIFILM Corporation, Tokyo (JP)

(72) Inventors: Yusuke Fujii, Kanagawa (JP); Norihide Shimohara, Kanagawa (JP); Masaharu Kawai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 18/824,925

(22) Filed: Sep. 5, 2024

(65) Prior Publication Data

US 2024/0425715 A1 Dec. 26, 2024

Related U.S. Application Data

(63) Continuation of application No. PCT/JP2023/012283, filed on Mar. 27, 2023.

(30) Foreign Application Priority Data

Mar. 30, 2022 (JP) ................................ 2022-056417

(51) Int. Cl.

*B41M 5/00* (2006.01)
*B41M 7/00* (2006.01)
*C09D 7/80* (2018.01)
*C09D 11/037* (2014.01)
*C09D 11/322* (2014.01)
*C09D 11/52* (2014.01)

(52) U.S. Cl.

CPC ........... *C09D 11/52* (2013.01); *B41M 5/0047* (2013.01); *B41M 7/0081* (2013.01); *B41M 7/009* (2013.01); *C09D 7/80* (2018.01); *C09D 11/037* (2013.01); *C09D 11/322* (2013.01)

(58) Field of Classification Search

CPC .......... B41J 2/01; B41M 5/00; B41M 5/0047; B41M 7/0081; B41M 7/009; C09D 7/80; C09D 11/037; C09D 11/30; C09D 11/322; C09D 11/52

See application file for complete search history.

(56) References Cited

U.S. PATENT DOCUMENTS 9,540,734 B2 1/2017 Wu et al.
10,160,869 B2 12/2018 Wu et al.
2009/0167817 A1* 7/2009 Orr ........................ B29C 70/78 347/37
2013/0002773 A1 1/2013 Fujii et al.
2018/0310366 A1 10/2018 Nelson et al.
2024/0312971 A1* 9/2024 Lee ........................ H10N 39/00

FOREIGN PATENT DOCUMENTS

| | | |
|---|---|---|
| CN | 107148154 | 9/2017 |
| CN | 110105814 | 8/2019 |
| JP | 2005089500 | 4/2005 |
| JP | 2015109273 | 6/2015 |
| JP | 2019018565 | 2/2019 |
| JP | 2019504469 | 2/2019 |

OTHER PUBLICATIONS

"International Search Report (Form PCT/ISA/210) of PCT/JP2023/012283", mailed on May 30, 2023, with English translation thereof, pp. 1-5.

"Written Opinion of the International Searching Authority (Form PCT/ISA/237) of PCT/JP2023/012283", mailed on May 30, 2023, with English translation thereof, pp. 1-6.

"The First Office Action of China Counterpart Application", issued on Jan. 27, 2026, with English translation thereof, p. 1-p. 15.

"Notice of Reasons for Refusal of Japan Counterpart Application", issued on Apr. 21, 2026, with English translation thereof, p. 1-p. 4.

"The Second Office Action of China Counterpart Application", with English translation thereof, issued on Jun. 27, 2026, pp. 1-19.

* cited by examiner

*Primary Examiner* — Anh T Vo
(74) *Attorney, Agent, or Firm* — JCIPRNET

(57) ABSTRACT

An object of the present invention is to provide a manufacturing method of a conductive layer, in which storage stability and jetting stability of an ink are excellent and a conductive layer having excellent conductivity can be formed. The manufacturing method of a conductive layer of the present invention includes a deaeration step of deaerating a conductive ink accommodated in an ink container and a conductive layer forming step of, with an ink jet recording method, applying the deaerated conductive ink onto a substrate by jetting the deaerated conductive ink from a nozzle to form a conductive layer, in which the conductive ink contains at least one material selected from the group consisting of a metal salt, a metal complex, and metal particles, and in a case where a dissolved oxygen amount in the conductive ink before the deaeration step is denoted as a dissolved oxygen amount A and a dissolved oxygen amount in the deaerated conductive ink after the deaeration step is denoted as a dissolved oxygen amount B, a value obtained by subtracting the dissolved oxygen amount B from the dissolved oxygen amount A is larger than 15 mg/L.

20 Claims, No Drawings

MANUFACTURING METHOD OF CONDUCTIVE LAYER

CROSS-REFERENCE TO RELATED APPLICATIONS

This application is a Continuation of PCT International Application No. PCT/JP2023/012283 filed on Mar. 27, 2023, which claims priority under 35 U.S.C. § 119 (a) to Japanese Patent Application No. 2022-056417 filed on Mar. 30, 2022. The above applications are hereby expressly incorporated by reference, in their entirety, into the present application.

BACKGROUND OF THE INVENTION

1. Field of the Invention

The present invention relates to a manufacturing method of a conductive layer.

2. Description of the Related Art

A method of forming a conductive layer by applying a conductive ink containing a metal component onto a substrate with an ink jet recording method has been widely known. As the conductive ink used in such an ink jet recording method, JP2015-109273A discloses a conductive composition containing a branched metal carboxylate (for example, silver neodecanoate), and an aromatic hydrocarbon solvent and an aliphatic solvent in which the branched metal carboxylate is soluble.

SUMMARY OF THE INVENTION

An ink for ink jet recording is required to be normally jetted from a nozzle of an ink jet recording device, that is, it is required to have excellent jetting stability of the ink.

In addition, the ink for ink jet recording may be stored in an ink container and then jetted from a nozzle of an ink jet head. For example, in a case of using an ink containing a metal salt, a metal complex, or metal particles, the metal salt, the metal complex, or the metal particles may be reduced during the storage of the ink, and a change in physical properties before and after the storage of the ink may be large. Therefore, there is a demand for an ink having little change in physical properties before and after the storage of the ink, that is, an ink having excellent storage stability.

In addition, there is a demand for further improving conductivity of a conductive layer formed of the ink for ink jet recording.

The present inventors have found that, in a case where the conductive composition as disclosed in JP2015-109273A is used as the ink for ink jet recording, at least one performance of the storage stability of the ink, the jetting stability of the ink, or the conductivity of the conductive layer may not reach the required level in recent years, and there is room for improvement.

Therefore, an object of the present invention is to provide a manufacturing method of a conductive layer, in which storage stability and jetting stability of an ink are excellent and a conductive layer having excellent conductivity can be formed.

As a result of intensive studies to achieve the above-described object, the present inventors have found that, in a manufacturing method of a conductive layer, including a deaeration step of deaerating an ink containing a metal component, which is accommodated in an ink container, and a conductive layer forming step of forming a conductive layer using the deaerated ink by an ink jet recording method, a desired effect is obtained in a case where a value obtained by subtracting a dissolved oxygen amount B in the deaerated ink after the deaeration step from a dissolved oxygen amount A in the ink before the deaeration step is larger than 15 mg/L, and have completed the present invention.

That is, the present inventors have found that the above-described object can be achieved by employing the following configurations.

[1]

A manufacturing method of a conductive layer, comprising:

a deaeration step of deaerating a conductive ink accommodated in an ink container; and a conductive layer forming step of, with an ink jet recording method, applying the deaerated conductive ink onto a substrate by jetting the deaerated conductive ink from a nozzle to form a conductive layer, in which the conductive ink contains at least one material selected from the group consisting of a metal salt, a metal complex, and metal particles, and in a case where a dissolved oxygen amount in the conductive ink before the deaeration step is denoted as a dissolved oxygen amount A and a dissolved oxygen amount in the deaerated conductive ink after the deaeration step is denoted as a dissolved oxygen amount B, a value obtained by subtracting the dissolved oxygen amount B from the dissolved oxygen amount A is larger than 15 mg/L.

[2]

The manufacturing method of a conductive layer according to [1], in which the dissolved oxygen amount B is 10 mg/L or less.

[3]

The manufacturing method of a conductive layer according to [1] or [2], in which a metal constituting the metal salt, the metal complex, and the metal particles includes at least one of silver or copper.

[4]

The manufacturing method of a conductive layer according to any one of [1] to [3], in which the conductive ink contains at least one of the metal salt or the metal complex.

[5]

The manufacturing method of a conductive layer according to any one of [1] to [4], in which, in a case where a molar concentration of metals in the conductive ink is denoted as Mm and a molar concentration of dissolved oxygen in the deaerated conductive ink after the deaeration step is denoted as Mb, a value of Mm/Mb is 1,700 to 100,000, provided that units of Mm and Mb are both mmol/L.

[6]

The manufacturing method of a conductive layer according to any one of [1] to [5], in which the conductive layer forming step includes a curing treatment of performing at least one of heating or light irradiation on the deaerated conductive ink applied onto the substrate to cure the deaerated ink applied onto the substrate, and a time from a point in time at which the deaerated ink is landed on the substrate until the heating or the light irradiation is started is within 1 second.

[7]

The manufacturing method of a conductive layer according to any one of [1] to [6], in which a temperature of the conductive ink in a case of performing the deaeration step is 30° C. or higher.

According to the present invention, it is possible to provide a manufacturing method of a conductive layer, in which storage stability and jetting stability of an ink are excellent and a conductive layer having excellent conductivity can be formed.

DESCRIPTION OF THE PREFERRED EMBODIMENTS

Hereinafter, the present invention will be described in detail.

The description of configuration requirements described below may be made based on typical embodiments of the present invention, but the present invention is not limited to such embodiments.

In the present specification, numerical ranges represented by "to" include numerical values before and after "to" as lower limit values and upper limit values. In a numerical range described in a stepwise manner in the present specification, an upper limit value or a lower limit value described in a certain numerical range may be replaced with an upper limit value or a lower limit value in another numerical range described in a stepwise manner. In addition, in the numerical range described in the present specification, an upper limit value and a lower limit value described in a certain numerical range may be replaced with values shown in Examples.

In the present specification, for each component, one kind of substance corresponding to each component may be used alone, or two or more kinds thereof may be used in combination. Here, in a case where two or more kinds of substances are used in combination for each component, the content of the component indicates the total content of two or more substances, unless otherwise specified.

In the present specification, a combination of two or more preferred aspects is a more preferred aspect.

In the present specification, the meaning of the term "step" includes not only an independent step but also a step whose intended purpose is achieved even in a case where the step is not clearly distinguished from other steps.

[Manufacturing Method of Conductive Layer]

The manufacturing method of a conductive layer according to the embodiment of the present invention includes a deaeration step of deaerating a conductive ink accommodated in an ink container and a conductive layer forming step of, with an ink jet recording method, applying the deaerated conductive ink onto a substrate by jetting the deaerated conductive ink from a nozzle to form a conductive layer. The conductive ink contains at least one material selected from the group consisting of a metal salt, a metal complex, and metal particles. In a case where a dissolved oxygen amount in the conductive ink before the deaeration step is denoted as a dissolved oxygen amount A and a dissolved oxygen amount in the deaerated conductive ink after the deaeration step is denoted as a dissolved oxygen amount B, a value obtained by subtracting the dissolved oxygen amount B from the dissolved oxygen amount A is larger than 15 mg/L.

With the manufacturing method of a conductive layer according to the embodiment of the present invention, storage stability and jetting stability of an ink are excellent, and a conductive layer having excellent conductivity can be formed. The details of the reason for this are not clear, but it is presumed as follows.

In a case where the value obtained by subtracting the dissolved oxygen amount B from the dissolved oxygen amount A is sufficiently large, it is presumed that, in storage of the conductive ink before the deaeration step, reduction of the metal salt, the metal complex, or the metal particles, contained in the conductive ink, is suppressed, and thus the storage stability of the ink is excellent. In addition, in a case of jetting the conductive ink, it is presumed that, since the dissolved oxygen amount in the conductive ink is small, nozzle missing, nozzle clogging, and the like due to generation of air bubbles or the like are suppressed, and thus the jetting stability of the ink is excellent. In addition, since there are few air bubbles in liquid droplets of the conductive ink, it is presumed that the conductive layer to be obtained has fewer regions (voids) where no conductive material is present, and a volume resistivity of the conductive layer is reduced, and the conductive layer having excellent conductivity is obtained. In addition, since oxygen which suppresses the reduction is small in the conductive ink, the reduction of the metal salt, the metal complex, or the metal particles in the conductive ink jetted from the nozzle is accelerated, and thus the conductive layer having excellent conductivity is obtained.

<Conductive Ink>

The conductive ink means an ink for forming a layer having conductivity (that is, the conductive layer). The conductivity means a property of a volume resistivity of less than $10^8$ Ωcm.

The conductive ink contains at least one material selected from the group consisting of a metal salt, a metal complex, and metal particles.

Among these, from the viewpoint that the effects of the present invention are more excellent, the conductive ink preferably contains at least one of a metal salt or a metal complex; and more preferably contains at least one of a metal salt or a metal complex and does not contain metal particles.

Hereinafter, each of an ink containing metal particles (hereinafter, also referred to as "metal particle ink"), an ink containing a metal complex (hereinafter, also referred to as "metal complex ink"), and an ink containing a metal salt (hereinafter, also referred to as "metal salt ink") will be described.

Among these, from the viewpoint that the effects of the present invention are more excellent, the conductive ink is preferably the metal salt ink or the metal complex ink.

(Metal Particle Ink)

The metal particle ink is, for example, a conductive ink in which metal particles are dispersed in a dispersion medium.

—Metal Particles—

Examples of the metal constituting the metal particles include base metal and noble metal particles. Examples of the base metal include nickel, titanium, cobalt, copper, chromium, manganese, iron, zirconium, tin, tungsten, molybdenum, and vanadium. Examples of the noble metal include gold, silver, platinum, palladium, iridium, osmium, ruthenium, rhodium, rhenium, and alloys containing these metals. Among these, from the viewpoint of conductivity, the metal constituting the metal particles preferably includes at least one selected from the group consisting of silver, gold, platinum, nickel, palladium, or copper; more preferably includes at least one of silver or copper; and still more preferably includes silver.

In the present invention, the definition of "metal particles" does not include metal oxide particles such as titanium oxide.

An average particle diameter of the metal particles is not particularly limited, but is preferably 10 to 500 nm and more preferably 10 nm to 200 nm. In a case where the average particle diameter is within the above-described range, a calcining temperature of the metal particles is lowered, and process suitability of the conductive layer is improved. In particular, since the ink jet recording method is used in the present invention, jettability of the ink is improved, and pattern formability and uniformity of a thickness of the conductive layer tend to be improved. The average particle diameter mentioned herein means an average value of primary particle diameters of the metal particles (average primary particle diameter).

The average particle diameter of the metal particles is measured by a laser diffraction/scattering method. The average particle diameter of the metal particles can be, for example, a value obtained by measuring a 50% cumulative volume-based diameter (D50) three times and calculating an average value of D50 measured three times, and can be measured using a laser diffraction/scattering-type particle size distribution analyzer (trade name "LA-960" manufactured by Horiba, Ltd.).

In addition, the metal particle ink may contain metal particles having an average particle diameter of 500 nm or more, as necessary. In a case where the metal particle ink contains metal particles having an average particle diameter of 500 nm or more, a melting point of the nm-sized metal particles is lowered around the μm-sized metal particles, which makes it possible to bond the metal particles.

A content of the metal particles in the metal particle ink is preferably 10% to 90% by mass and more preferably 20% to 50% by mass with respect to the total mass of the metal particle ink. In a case where the content of the metal particles is 10% by mass or more, surface resistivity of the conductive film is further reduced. In a case where the content of the metal particles is 90% by mass or less, the jetting stability of the metal particle ink is more excellent.

In addition to the metal particles, the metal particle ink may contain, for example, a dispersing agent, a resin, a dispersion medium, a thickener, and a surface tension adjuster.

—Dispersing Agent—

The metal particle ink may contain a dispersing agent which adheres to at least a part of a surface of the metal particles. The dispersing agent substantially constitutes metal colloidal particles, together with the metal particles. The dispersing agent has an action of coating the metal particles to improve dispersibility of the metal particles and prevent aggregation. The dispersing agent is preferably an organic compound capable of forming the metal colloidal particles. From the viewpoint of conductivity and dispersion stability, the dispersing agent is preferably an amine, a carboxylic acid or a salt thereof, an alcohol, or a resin dispersing agent.

The metal particle ink may contain one dispersing agent or two or more dispersing agents.

Examples of the amine include an aliphatic amine and an aromatic amine.

The aliphatic amine may be saturated or unsaturated. Among these, the aliphatic amine is preferably an aliphatic amine having 4 to 8 carbon atoms. The aliphatic amine having 4 to 8 carbon atoms may be linear or branched, or may have a ring structure.

Specific examples of the aliphatic amine include butylamine, normal pentylamine, isopentylamine, hexylamine, 2-ethylhexylamine, and octylamine.

Specific examples of the amine having an alicyclic structure include cycloalkylamines such as cyclopentylamine and cyclohexylamine.

Specific examples of the aromatic amine include aniline.

The amine may have a functional group other than an amino group. Examples of the functional group other than an amino group include a hydroxy group, a carboxy group, an alkoxy group, a carbonyl group, an ester group, and a mercapto group.

Specific examples of the carboxylic acid include formic acid, oxalic acid, acetic acid, hexanoic acid, acrylic acid, octylic acid, oleic acid, tianshic acid, ricinoleic acid, gallic acid, and salicylic acid.

Examples of the carboxylate include a metal salt of the carboxylic acid. The metal ion forming the metal salt of the carboxylic acid may be one kind or two or more kinds.

The carboxylic acid and the carboxylate may have a functional group other than a carboxy group. Examples of the functional group other than a carboxy group include an amino group, a hydroxy group, an alkoxy group, a carbonyl group, an ester group, and a mercapto group.

Specific examples of the alcohol include a terpene-based alcohol, an allyl alcohol, and an oleyl alcohol. The alcohol is likely to be coordinated with the surface of the metal particles, and can suppress the aggregation of the metal particles.

Examples of the resin dispersing agent include a dispersing agent which has a nonionic group as a hydrophilic group and can be uniformly dissolved in a solvent.

Specific examples of the resin dispersing agent include polyvinylpyrrolidone, polyethylene glycol, a polyethylene glycol-polypropylene glycol copolymer, polyvinyl alcohol, polyallylamine, and a polyvinyl alcohol-polyvinyl acetate copolymer.

A weight-average molecular weight of the resin dispersing agent is preferably 1,000 to 50,000 and more preferably 1,000 to 30,000.

A content of the dispersing agent in the metal particle ink is preferably 0.5% to 50% by mass and more preferably 1% to 30% by mass with respect to the total mass of the metal particle ink.

—Dispersion Medium—

The metal particle ink preferably contains a dispersion medium. A type of the dispersion medium is not particularly limited, and examples thereof include a hydrocarbon, an alcohol, and water.

The metal particle ink may contain one dispersion medium or two or more dispersion media.

The dispersion medium contained in the metal particle ink is preferably volatile.

A boiling point of the dispersion medium is preferably 50° C. to 250° C., more preferably 70° C. to 220° C., and still more preferably 80° C. to 200° C. In a case where the boiling point of the dispersion medium is 50° C. to 250° C., the stability and baking properties of the metal particle ink tend to be simultaneously achieved.

In the present specification, the boiling point means a standard boiling point unless otherwise specified.

Examples of the hydrocarbon include an aliphatic hydrocarbon and an aromatic hydrocarbon.

Specific examples of the aliphatic hydrocarbon include a saturated or unsaturated aliphatic hydrocarbon such as tetradecane, octadecane, heptamethylnonane, tetramethylpentadecane, hexane, heptane, octane, nonane, decane, tridecane, methylpentane, normal paraffin, and isoparaffin.

Specific examples of the aromatic hydrocarbon include toluene and xylene.

Examples of the alcohol include an aliphatic alcohol and an alicyclic alcohol. In a case where an alcohol is used as the dispersion medium, the dispersing agent is preferably an amine or a carboxylic acid.

Specific examples of the aliphatic alcohol include a saturated or unsaturated aliphatic alcohol having 6 to 20 carbon atoms that may contain an ether bond in a chain, such as heptanol, octanol (for example, 1-octanol, 2-octanol, or 3-octanol), decanol (for example, 1-decanol), lauryl alcohol, tetradecyl alcohol, cetyl alcohol, 2-ethyl-1-hexanol, octadecyl alcohol, hexadecenol, and oleyl alcohol.

Specific examples of the alicyclic alcohol include a cycloalkanol such as cyclohexanol; a terpene alcohol such as terpineol (including α, β, and γ isomers, or any mixture of these) and dihydroterpineol; myrtenol, sobrerol, menthol, carveol, perillyl alcohol, pinocarveol, and verbenol.

The dispersion medium may be water. From the viewpoint of adjusting physical properties such as viscosity, surface tension, and volatility, the dispersion medium may be a mixed solvent of water and another solvent.

Another solvent to be mixed with water is preferably an alcohol or glycol ether. The alcohol or glycol ether used together with water is preferably an alcohol or glycol ether, which is miscible with water and has a boiling point of 130° C. or lower.

Specific examples of the alcohol include 1-propanol, 2-propanol, 1-butanol, 2-butanol, tert-butanol, and 1-pentanol.

Specific examples of the glycol ether include ethylene glycol monomethyl ether, ethylene glycol monoethyl ether, ethylene glycol monopropyl ether, and propylene glycol monomethyl ether.

A content of the dispersion medium in the metal particle ink is preferably 1% to 50% by mass, more preferably 10% to 45% by mass, and still more preferably 20% to 40% by mass with respect to the total mass of the metal particle ink. In a case where the content of the dispersion medium is 1% to 50% by mass, the conductive ink has sufficient conductivity.

—Resin—

The metal particle ink may contain a resin.

Examples of the resin include polyester, polyurethane, a melamine resin, an acrylic resin, a styrene-based resin, a polyether, and a terpene resin.

The metal particle ink may contain one resin or two or more resins.

A content of the resin in the metal particle ink is preferably 0.1% to 5% by mass with respect to the total mass of the metal particle ink.

—Thickener—

The metal particle ink may contain a thickener.

Specific examples of the thickener include clay minerals such as clay, bentonite, and hectorite; cellulose derivatives such as methyl cellulose, carboxymethyl cellulose, hydroxyethyl cellulose, hydroxypropyl cellulose, and hydroxypropyl methyl cellulose; and polysaccharides such as xanthan gum and guar gum.

The metal particle ink may contain one thickener or two or more thickeners.

A content of the thickener in the metal particle ink is preferably 0.1% to 5% by mass with respect to the total mass of the metal particle ink.

—Surfactant—

The metal particle ink may contain a surfactant. In a case where the metal particle ink contains a surfactant, a uniform conductive ink film is likely to be formed.

The surfactant may be an anionic surfactant, a cationic surfactant, or a nonionic surfactant. Among these, from the viewpoint that the surface tension can be adjusted with a small content, a fluorine-based surfactant is preferable as the surfactant. In addition, the surfactant is preferably a compound having a boiling point of higher than 250° C.

—Physical Properties of Metal Particle Ink—

A viscosity of the metal particle ink is preferably 1 to 100 mPa·s, more preferably 2 to 50 mPa·s, and still more preferably 3 to 30 mPa·s.

The viscosity of the metal particle ink is a value measured at 25° C. using a viscometer.

The viscosity is measured using, for example, a VISCOMETER TV-22 type viscometer (manufactured by Toki Sangyo Co., Ltd.).

A surface tension of the metal particle ink is not particularly limited, and is preferably 20 to 45 mN/m and more preferably 25 to 40 mN/m.

The surface tension is a value measured at 25° C. using a surface tension meter. The surface tension of the metal particle ink is measured, for example, using DY-700 (manufactured by Kyowa Interface Science Co., Ltd.).

—Manufacturing Method of Metal Particles—

The metal particles may be a commercially available product or may be manufactured by a known method. Examples of a manufacturing method of the metal particles include a wet reduction method, a vapor phase method, and a plasma method. Preferred examples of the manufacturing method of the metal particles include a wet reduction method capable of manufacturing metal particles having an average particle diameter of 200 nm or less and having a narrow particle size distribution. Examples of the manufacturing method of the metal particles by a wet reduction method include the method described in JP2017-037761A, WO2014-057633A, and the like, the method including: a step of mixing a metal salt with a reducing agent to obtain a complexing reaction solution; and a step of heating the complexing reaction solution to reduce metal ions in the complexing reaction solution and to obtain a slurry of metal nanoparticles.

In manufacturing the metal particle ink, a heat treatment may be performed such that the content of each component contained in the metal particle ink is adjusted to be in a predetermined range. The heat treatment may be performed under reduced pressure or under normal pressure. In a case where the heat treatment is performed under normal pressure, the heat treatment may be performed in the atmospheric air or in an inert gas atmosphere.

(Metal Complex Ink)

The metal complex ink is, for example, a conductive ink obtained by dissolving a metal complex in a solvent.

—Metal Complex—

Examples of a metal constituting the metal complex include silver, copper, gold, aluminum, magnesium, tungsten, molybdenum, zinc, nickel, iron, platinum, tin, and lead. Among these, from the viewpoint of conductivity, the metal constituting the metal complex preferably includes at least one selected from the group consisting of silver, gold, platinum, nickel, palladium, or copper; more preferably includes at least one of silver or copper; and still more preferably includes silver.

A content of the metal contained in the metal complex ink in terms of metal element is preferably 1% to 40% by mass, more preferably 5% to 30% by mass, and still more preferably 7% to 20% by mass with respect to the total mass of the metal complex ink.

The metal complex can be obtained, for example, by reacting a metal salt with a complexing agent. Examples of a manufacturing method of the metal complex include a method of adding a metal salt and a complexing agent to an organic solvent and stirring the mixture for a predetermined time. The stirring method is not particularly limited, and can be appropriately selected from known methods such as a stirring method using a stirrer, a stirring blade, or a mixer, and a method of applying ultrasonic waves.

Examples of the metal salt include an oxide, a thiocyanate, a sulfide, a chloride, a cyanide, a cyanate, a carbonate, an acetate, a nitrate, a nitrite, a sulfate, a phosphate, a perchlorate, a tetrafluoroborate, an acetylacetonate complex salt, or a carboxylate of a metal.

Examples of the complexing agent include an amine, an ammonium carbamate-based compound, an ammonium carbonate-based compound, an ammonium bicarbonate-based compound, and a carboxylic acid. Among these, from the viewpoint of conductivity and stability of the metal complex, the complexing agent preferably includes at least one selected from the group consisting of an ammonium carbamate-based compound, an ammonium carbonate-based compound, an amine, and a carboxylic acid having 8 to 20 carbon atoms.

The metal complex has a structure derived from a complexing agent, and preferably has a structure derived from at least one selected from the group consisting of an ammonium carbamate-based compound, an ammonium carbonate-based compound, an amine, and a carboxylic acid having 8 to 20 carbon atoms.

Examples of the amine as the complexing agent include ammonia, a primary amine, a secondary amine, a tertiary amine, and a polyamine.

Specific examples of a primary amine having a linear alkyl group include methylamine, ethylamine, 1-propylamine, n-butylamine, n-pentylamine, n-hexylamine, heptylamine, octylamine, nonylamine, n-decylamine, undecylamine, dodecylamine, tridecylamine, tetradecylamine, pentadecylamine, hexadecylamine, heptadecylamine, and octadecylamine.

Specific examples of a primary amine having a branched alkyl group include isopropylamine, sec-butylamine, tert-butylamine, isopentylamine, 2-ethylhexylamine, and tert-octylamine.

Specific examples of a primary amine having an alicyclic structure include cyclohexylamine and dicyclohexylamine.

Specific examples of a primary amine having a hydroxyalkyl group include ethanolamine, diethanolamine, triethanolamine, N-methylethanolamine, propanolamine, isopropanolamine, dipropanolamine, diisopropanolamine, tripropanolamine, and triisopropanolamine.

Specific examples of a primary amine having an aromatic ring include benzylamine, N,N-dimethylbenzylamine, phenylamine, diphenylamine, triphenylamine, aniline, N,N-dimethylaniline, N,N-dimethyl-p-toluidine, 4-aminopyridine, and 4-dimethylaminopyridine.

Specific examples of the secondary amine include dimethylamine, diethylamine, dipropylamine, dibutylamine, diphenylamine, dicyclopentylamine, and methylbutylamine.

Specific examples of the tertiary amine include trimethylamine, triethylamine, tripropylamine, and triphenylamine.

Specific examples of the polyamine include ethylenediamine, 1,3-diaminopropane, diethylenetriamine, triethylenetetramine, tetramethylenepentamine, hexamethylenediamine, tetraethylenepentamine, and a combination of these amines.

The amine is preferably an alkylamine, more preferably an alkylamine having 3 to 10 carbon atoms, and still more preferably a primary alkylamine having 4 to 10 carbon atoms.

The metal complex may be configured of one amine or two or more amines.

In a case of reacting the metal salt with the amine, a ratio of a substance amount of the amine substance to a substance amount of the metal salt is preferably 1 to 15 times and more preferably 1.5 to 6 times. In a case where the above-described ratio is within the above-described range, the complex formation reaction is completed, and a transparent solution is obtained.

Specific examples of the ammonium carbamate-based compound as the complexing agent include ammonium carbamate, methylammonium methylcarbamate, ethylammonium ethylcarbamate, 1-propylammonium 1-propylcarbamate, isopropylammonium isopropylcarbamate, butylammonium butylcarbamate, isobutylammonium isobutylcarbamate, amylammonium amylcarbamate, hexylammonium hexylcarbamate, heptylammonium heptylcarbamate, octylammonium octylcarbamate, 2-ethylhexylammonium 2-ethylhexylcarbamate, nonylammonium nonylcarbamate, and decylammonium decylcarbamate.

Specific examples of the ammonium carbonate-based compound as the complexing agent include ammonium carbonate, methylammonium carbonate, ethylammonium carbonate, 1-propylammonium carbonate, isopropylammonium carbonate, butylammonium carbonate, isobutylammonium carbonate, amylammonium carbonate, hexylammonium carbonate, heptylammonium carbonate, octylammonium carbonate, 2-ethylhexylammonium carbonate, nonylammonium carbonate, and decylammonium carbonate.

Specific examples of the ammonium bicarbonate-based compound as the complexing agent include ammonium bicarbonate, methylammonium bicarbonate, ethylammonium bicarbonate, 1-propylammonium bicarbonate, isopropylammonium bicarbonate, butylammonium bicarbonate, isobutylammonium bicarbonate, amylammonium bicarbonate, hexylammonium bicarbonate, heptylammonium bicarbonate, octylammonium bicarbonate, 2-ethylhexylammonium bicarbonate, nonylammonium bicarbonate, and decylammonium bicarbonate.

In a case where the metal salt is reacted with the ammonium carbamate-based compound, the ammonium carbonate-based compound, or the ammonium bicarbonate-based compound, a ratio of a substance amount of the ammonium carbamate-based compound, the ammonium carbonate-based compound, or the ammonium bicarbonate-based compound to a substance amount of the metal salt is preferably 0.01 to 1 time and more preferably 0.05 to 0.6 times.

Specific examples of the carboxylic acid as a complexing agent include caproic acid, caprylic acid, pelargonic acid, 2-ethylhexanoic acid, capric acid, neodecanoic acid, undecanoic acid, lauric acid, myristic acid, palmitic acid, stearic acid, palmitoleic acid, oleic acid, linoleic acid, and linolenic acid. Among these, the carboxylic acid is preferably a carboxylic acid having 8 to 20 carbon atoms and more preferably a carboxylic acid having 10 to 16 carbon atoms.

A content of the metal complex in the metal complex ink is preferably 10% to 90% by mass and more preferably 10% to 40% by mass with respect to the total mass of the metal complex ink. In a case where the content of the metal complex is 10% by mass or more, surface resistivity is further reduced. In a case where the content of the metal complex is 90% by mass or less, the jetting stability of the metal complex ink is further improved.

—Solvent—

The metal complex ink preferably contains a solvent. The solvent is not particularly limited as long as it can dissolve the component contained in the metal complex ink, such as the metal complex.

From the viewpoint of ease of manufacturing, a boiling point of the solvent is preferably 30° C. to 300° C., more preferably 50° C. to 200° C., and still more preferably 80° C. to 180° C.

It is preferable that the solvent is contained in the metal complex ink such that a concentration of metal ions (an amount of metal present as liberated ions with respect to 1 g of the metal complex) with respect to the metal complex is 0.01 to 3.6 mmol/g; and it is more preferable that the solvent is contained in the metal complex ink such that the concentration of the metal ions with respect to the metal complex is 0.05 to 2 mmol/g. In a case where the concentration of the metal ions is within the above-described range, the metal complex ink has excellent fluidity and exhibits excellent conductivity.

Examples of the solvent include a hydrocarbon, a cyclic hydrocarbon, an aromatic hydrocarbon, a carbamate, an alkene, an amide, an ether, an ester, an alcohol, a thiol, a thioether, phosphine, and water. The metal complex ink may contain only one solvent or two or more solvents.

The hydrocarbon is preferably a linear or branched hydrocarbon having 6 to 20 carbon atoms. Specific examples of the hydrocarbon include pentane, hexane, heptane, octane, nonane, decane, undecane, dodecane, tridecane, tetradecane, pentadecane, hexadecane, octadecane, nonadecane, and icosane.

The cyclic hydrocarbon is preferably a cyclic hydrocarbon having 6 to 20 carbon atoms. Specific examples of the cyclic hydrocarbons include cyclohexane, cycloheptane, cyclooctane, cyclononane, cyclodecane, and decalin.

Specific examples of the aromatic hydrocarbon include benzene, toluene, xylene, trimethylbenzene, and tetraline.

The ether may be any of a linear ether, a branched ether, or a cyclic ether. Specific examples of the ether include diethyl ether, dipropyl ether, dibutyl ether, methyl-t-butyl ether, tetrahydrofuran, tetrahydropyrane, dihydropyrane, and 1,4-dioxane.

The alcohol may be any of a primary alcohol, a secondary alcohol, or a tertiary alcohol.

Specific examples of the alcohol include ethanol, 1-propanol, 2-propanol, 1-methoxy-2-propanol, 1-butanol, 2-butanol, 1-pentanol, 2-pentanol, 3-pentanol, 1-hexanol, 2-hexanol, 3-hexanol, 1-octanol, 2-octanol, 3-octanol, tetrahydrofurfuryl alcohol, cyclopentanol, terpineol, decanol, isodecyl alcohol, lauryl alcohol, isolauryl alcohol, myristyl alcohol, isomyristyl alcohol, cetyl alcohol (cetanol), isocetyl alcohol, stearyl alcohol, isostearyl alcohol, oleyl alcohol, isooleyl alcohol, linoleyl alcohol, isolinoleyl alcohol, palmityl alcohol, isopalmityl alcohol, eicosyl alcohol, and isoeicosyl alcohol.

Specific examples of the ketone include acetone, methyl ethyl ketone, methyl isobutyl ketone, and cyclohexanone.

Specific examples of the ester include methyl acetate, ethyl acetate, isopropyl acetate, butyl acetate, isobutyl acetate, sec-butyl acetate, methoxybutyl acetate, ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, propylene glycol monoethyl ether acetate, propylene glycol monobutyl ether acetate, dipropylene glycol monomethyl ether acetate, dipropylene glycol monoethyl ether acetate, dipropylene glycol monobutyl ether acetate, and 3-methoxybutyl acetate.

—Reducing Agent—

The metal complex ink may contain a reducing agent. In a case where the metal complex ink contains a reducing agent, reduction of the metal complex into a metal is facilitated.

Specific examples of the reducing agent include a borohydride metal salt, an aluminum hydride salt, an amine, an alcohol, an organic acid, reduced sugar, a sugar alcohol, sodium sulfite, a hydrazine compound, dextrin, hydroquinone, hydroxylamine, ethylene glycol, glutathione, and an oxime compound.

The reducing agent may be the oxime compound described in JP2014-516463A. Specific examples of the oxime compound include acetone oxime, cyclohexanone oxime, 2-butanone oxime, 2,3-butanedione monoxime, dimethyl glyoxime, methyl acetoacetate monoxime, methyl pyruvate monoxime, benzaldehyde oxime, 1-indanone oxime, 2-adamantanone oxime, 2-methylbenzamide oxime, 3-methylbenzamide oxime, 4-methylbenzamide oxime, 3-aminobenzamide oxime, 4-aminobenzamide oxime, acetophenone oxime, benzamide oxime, and pinacolone oxime.

The metal complex ink may contain one reducing agent or two or more reducing agents.

A content of the reducing agent in the metal complex ink is not particularly limited, but is preferably 0.1% to 20% by mass, more preferably 0.3% to 10% by mass, and still more preferably 1% to 5% by mass with respect to the total mass of the metal complex ink.

—Resin—

The metal complex ink may contain a resin. In a case where the metal complex ink contains a resin, adhesiveness of the metal complex ink to the substrate is improved.

Examples of the resin include polyester, polyethylene, polypropylene, polyacetal, polyolefin, polycarbonate, polyamide, a fluororesin, a silicone resin, ethyl cellulose, hydroxyethyl cellulose, rosin, an acrylic resin, polyvinyl chloride, polysulfone, polyvinylpyrrolidone, polyvinyl alcohol, a polyvinyl-based resin, polyacrylonitrile, polysulfide, polyamideimide, polyether, polyarylate, polyether ether ketone, polyurethane, an epoxy resin, a vinyl ester resin, a phenol resin, a melamine resin, and a urea resin.

The metal complex ink may contain one resin or two or more resins.

—Additive—

Within the scope that does not impair covering property or electromagnetic wave-shielding properties, the metal complex ink may further contain additives such as an inorganic salt, an organic salt, an inorganic oxide such as silica, a surface conditioner, a wetting agent, a crosslinking agent, an antioxidant, a rust inhibitor, a heat-resistant stabilizer, a surfactant, a plasticizer, a curing agent, a thickener, and a silane coupling agent. The total content of the additives in the metal complex ink is preferably 20% by mass or less with respect to the total mass of the metal complex ink.

—Physical Properties of Metal Complex Ink—

A viscosity of the metal complex ink is preferably 1 to 100 mPa·s, more preferably 2 to 50 mPa·s, and still more preferably 3 to 30 mPa·s.

The viscosity of the metal complex ink is a value measured at 25° C. using a viscometer. The viscosity is measured using, for example, a VISCOMETER TV-22 type viscometer (manufactured by Toki Sangyo Co., Ltd.).

A surface tension of the metal complex ink is not particularly limited, and is preferably 20 to 45 mN/m and more preferably 25 to 35 mN/m.

The surface tension is a value measured at 25° C. using a surface tension meter. The surface tension is measured, for example, using DY-700 (manufactured by Kyowa Interface Science Co., Ltd.).

(Metal Salt Ink)

The metal salt ink is, for example, a conductive ink obtained by dissolving a metal salt in a solvent.

—Metal Salt—

Examples of a metal constituting the metal salt include silver, copper, gold, aluminum, magnesium, tungsten, molybdenum, zinc, nickel, iron, platinum, tin, and lead. Among these, from the viewpoint of conductivity, the metal constituting the metal salt preferably includes at least one selected from the group consisting of silver, gold, platinum, nickel, palladium, or copper; more preferably includes at least one of silver or copper; and still more preferably includes silver.

A content of the metal contained in the metal salt ink in terms of metal element is preferably 1% to 40% by mass, more preferably 5% to 30% by mass, and still more preferably 7% to 20% by mass with respect to the total mass of the metal salt ink.

A content of the metal salt ink in the metal salt ink is preferably 10% to 90% by mass and more preferably 10% to 60% by mass with respect to the total mass of the metal salt ink. In a case where the content of the metal salt is 10% by mass or more, surface resistivity is further reduced. In a case where the content of the metal salt is 90% by mass or less, the jetting stability is further improved when the metal salt ink is jetted from the nozzle.

Examples of the metal salt include a benzoate, a halide, a carbonate, a citrate, an iodate, a nitrite, a nitrate, an acetate, a phosphate, a sulfate, a sulfide, a trifluoroacetate, or a carboxylate of a metal. Two or more kinds of salts may be combined.

From the viewpoint of conductivity and storage stability, the metal salt is preferably a metal carboxylate.

A carboxylic acid forming the metal carboxylate is preferably at least one selected from the group consisting of formic acid and a carboxylic acid having 1 to 30 carbon atoms; more preferably a carboxylic acid having 8 to 20 carbon atoms; and still more preferably a fatty acid having 8 to 20 carbon atoms. The fatty acid may be linear or branched, or may have a substituent.

Specific examples of the linear fatty acid include acetic acid, propionic acid, butyric acid, valeric acid, pentanoic acid, hexanoic acid, heptanoic acid, behenic acid, oleic acid, octanoic acid, nonanoic acid, decanoic acid, caproic acid, enanthic acid, caprylic acid, pelargonic acid, capric acid, and undecanoic acid.

Specific examples of the branched fatty acid include isobutyric acid, isovaleric acid, ethylhexanoic acid, neodecanoic acid, pivalic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, and 2-ethylbutanoic acid.

Specific examples of a carboxylic acid having a substituent include hexafluoroacetylacetonate, hydroangelate, 3-hydroxybutyric acid, 2-methyl-3-hydroxybutyric acid, 3-methoxybutyric acid, acetonedicarboxylic acid, 3-hydroxyglutaric acid, 2-methyl-3-hydroxyglutaric acid, and 2,2,4,4-hydroxyglutaric acid.

The metal salt may be a commercially available product, or may be manufactured by a known method. A silver salt is produced, for example, by the following method.

First, a silver compound (for example, silver acetate) functioning as a silver supply source and formic acid or a fatty acid having 1 to 30 carbon atoms in the same quantity as the molar equivalent of the silver compound are added to an organic solvent such as ethanol. The mixture is stirred for a predetermined time using an ultrasonic stirrer, and the formed precipitate is washed with ethanol and decanted. All of these steps can be performed at room temperature (25° C.). A mixing ratio of the silver compound and the formic acid or fatty acid having 1 to 30 carbon atoms is preferably 1:2 to 2:1, and more preferably 1:1, in terms of molar ratio.

—Other Components—

The metal salt ink may contain a solvent, a reducing agent, a resin, or an additive. Preferred aspects of the solvent, the reducing agent, the resin, and the additive are the same as those of the solvent, the reducing agent, the resin, and the additive, which may be contained in the metal complex ink.

—Physical Properties of Metal Salt Ink—

A viscosity of the metal salt ink is preferably 1 to 100 mPa·s, more preferably 2 to 50 mPa·s, and still more preferably 3 to 30 mPa·s.

The viscosity of the metal salt ink is a value measured at 25° C. by using a viscometer. The viscosity is measured using, for example, a VISCOMETER TV-22 type viscometer (manufactured by Toki Sangyo Co., Ltd.).

A surface tension of the metal salt ink is not particularly limited, and is preferably 20 to 45 mN/m and more preferably 25 to 35 mN/m.

The surface tension is a value measured at 25° C. using a surface tension meter. The surface tension is measured, for example, using DY-700 (manufactured by Kyowa Interface Science Co., Ltd.).

<Deaeration Step>

The deaeration step is a step of deaerating the conductive ink accommodated in an ink container. As a result, a deaerated conductive ink is obtained.

The conductive ink before the deaeration step is accommodated in an ink container. The ink container is not particularly limited, and examples thereof include known ink storage containers such as an ink pack and an ink cartridge.

The deaerated conductive ink may be accommodated in an ink container in which an ink before the deaeration is accommodated, or may be accommodated in an ink container different from the ink container in which the conductive ink before the deaeration is accommodated.

As the conductive ink before the deaeration step, a prepared conductive ink may be used as it is, or a conductive ink obtained by bubbling oxygen into the prepared conductive ink may be used.

(Deaeration Method)

A deaeration method in the deaeration step is not particularly limited, and examples thereof include a method of providing a deaeration unit that has a gas-permeable hollow fiber bundle between an ink container accommodating the conductive ink and a nozzle which is provided in an ink jet head of an ink jet recording device and jets the ink, and passing the conductive ink through the deaeration unit.

Examples of the hollow fiber bundle include a bundle of a plurality of hollow fibers. By setting an outside of the hollow fibers constituting the hollow fiber bundle to a decompressed state of 0.1 to 0.8 atm, dissolved oxygen in the conductive ink passing through the hollow fiber bundle can be removed.

Examples of the deaeration method also include a method of supplying the conductive ink to a sub tank provided in an ink supply path from the ink container to the ink jet head, reducing a pressure in the sub tank by a pump connected to the sub tank, and removing dissolved oxygen in the conductive ink supplied to the sub tank.

A degree of the decompression in the sub tank can be appropriately selected, and is preferably 0.1 to 0.8 atm. The deaerated conductive ink is preferably stored in the sub tank with an appropriate amount, and then fed to the nozzle which jets the ink. Specific examples of a device which can be used in the deaeration step include devices described in JP2000-141687A.

From the viewpoint of improving a deaeration efficiency, a temperature of the conductive ink in the deaeration step is preferably 20° C. or higher, more preferably 25° C. or higher, and still more preferably 30° C. or higher.

From the viewpoint of ink stability, the upper limit value of the temperature of the conductive ink in the deaeration step is preferably 80° C. or lower and more preferably 60° C. or lower.

(Dissolved Oxygen Amount)

From the viewpoint that the reduction of the metal component in the conductive ink is suppressed and the storage stability of the conductive ink is more excellent, the dissolved oxygen amount A in the conductive ink accommodated in the ink container before the deaeration step is preferably 15 mg/L or more, more preferably 20 mg/L or more, and still more preferably 25 mg/L or more.

From the viewpoint that the removal of the dissolved oxygen in the deaeration step is facilitated and the jetting stability of the conductive ink is more excellent, the dissolved oxygen amount A is preferably 45 mg/L or less, more preferably 40 mg/L or less, and still more preferably 30 mg/L or less.

From the viewpoint of ink stability in the ink jet recording device, the dissolved oxygen amount B in the deaerated conductive ink after the deaeration step is preferably 0.05 mg/L or more, more preferably 0.1 mg/L or more, and still more preferably 0.5 mg/L or more.

From the viewpoint of further improving the jetting stability of the conductive ink, the dissolved oxygen amount B is preferably 12 mg/L or less, more preferably 10 mg/L or less, still more preferably 8 mg/L or less, and particularly preferably 6 mg/L or less.

In the present invention, from the viewpoint that the effects of the present invention are more excellent, the value obtained by subtracting the dissolved oxygen amount B from the dissolved oxygen amount A (Dissolved oxygen amount A-Dissolved oxygen amount B) is more than 15 mg/L, preferably 16 mg/L or more, more preferably 18 mg/L or more, and still more preferably 20 mg/L or more.

From the viewpoint of deaeration treatment speed, the value obtained by subtracting the above-described dissolved oxygen amount B from the above-described dissolved oxygen amount A is preferably 40 mg/L or less, more preferably 35 mg/L or less, and still more preferably 30 mg/L or less.

The dissolved oxygen amount in the conductive ink according to the embodiment of the present invention can be measured by a gas chromatography method. A specific method for measuring the dissolved oxygen amount in the conductive ink is described in the section of Examples later.

Although the details of the reason have not been clarified yet, the present inventors have found that, in a case where a molar concentration Mb (unit: mmol/L) of dissolved oxygen in the deaerated conductive ink after the deaeration step and a molar concentration Mm (unit: mmol/L) of metals in the conductive ink satisfy a predetermined relationship, the jetting stability of the ink and the stability of the ink in the head are more excellent.

Specifically, a ratio (Mm/Mb) of the molar concentration Mm (unit: mmol/L) to the molar concentration Mb (unit: mmol/L) is preferably 1,600 or more, more preferably 1,700 or more, and still more preferably 2,500 or more. In a case where Mm/Mb is 1,600 or more, the jetting stability of the ink is more excellent.

In addition, Mm/Mb is preferably 110,000 or less, more preferably 100,000 or less, and still more preferably 90,000 or less. In a case where Mm/Mb is 110,000 or less, even in a case where the deaerated conductive ink is stored in the ink jet head, it is possible to suppress the change in physical properties such as coloration of the conductive ink (that is, the stability of the ink in the head is excellent).

Here, the molar concentration Mb is obtained by converting the above-described dissolved oxygen amount B (unit: mg/L) into the molar concentration (unit: mmol/L).

In addition, the molar concentration Mm is calculated based on a value obtained by converting the metals contained in the conductive ink (specifically, the metals constituting the metal complex, the metal salt, and the metal particles) into the metal element.

The molar concentration Mm is preferably 100 to 2,500 mmol/L, more preferably 300 to 2,000 mmol/L, and still more preferably 600 to 1,600 mmol/L.

The molar concentration Mb is preferably 0.0001 to 3 mmol/L, more preferably 0.005 to 2 mmol/L, and still more preferably 0.01 to 1 mmol/L.

<Conductive Layer Forming Step>

The conductive layer forming step is a step of, with an ink jet recording method, applying the deaerated conductive ink onto a substrate by jetting the deaerated conductive ink from a nozzle to form a conductive layer.

(Ink Jet Recording Method)

The ink jet recording method may be any of an electric charge control method of ejecting ink by using an electrostatic attraction force; a drop-on-demand method (pressure pulse method) of using a vibration pressure of a piezo element; an acoustic ink jet method of converting an electric signal into an acoustic beam, irradiating ink, and ejecting the ink using a radiation pressure; or a thermal ink jet (Bubble jet (registered trademark)) method of heating ink to form air bubbles and utilizing the generated pressure.

As the ink jet recording method, particularly, it is possible to effectively use the method described in JP1979-059936A (JP-S54-059936A), which is an ink jet recording method of causing an ink to experience a rapid volume change by the action of thermal energy and jetting the ink from a nozzle by using the acting force resulting from the change of state.

Regarding the ink jet recording method, a method described in paragraphs 0093 to 0105 of JP2003-306623A can also be referred to.

The ink jet head used in the ink jet recording method is not particularly limited, and examples thereof include ink jet heads for a shuttle scanning method of using short serial heads that are caused to scan a substrate in a width direction of the substrate so as to perform recording and ink jet heads for a line method of using line heads that each consist of recording elements arranged for the entire area of each side of a substrate.

The amount of droplets of the conductive ink jetted from the nozzle of the ink jet head is preferably 1 to 100 picoliters (pL), more preferably 2 to 80 pL, and still more preferably 2 to 20 pL.

(Substrate)

The conductive ink jetted from the nozzle is applied onto the substrate. The jetted conductive ink may be applied to be in contact with the substrate, or may be applied to be in contact with other layers (for example, an insulating layer described later) in a case where the other layers are provided on the substrate.

A material of the substrate is not particularly limited, and can be selected depending on purposes. Specific examples of the material of the substrate include synthetic resins such as polyimide, polyethylene terephthalate, polybutylene terephthalate, polytrimethylene terephthalate, polyethylene naphthalate, polybutylene naphthalate, polycarbonate, polyurethane, polyethylene, polypropylene, polyvinyl chloride, polystyrene, polyvinyl acetate, an acrylic resin, an acrylonitrile styrene resin (AS resin), an acrylonitrile-butadiene-styrene copolymer (ABS resin), triacetyl cellulose, polyamide, polyacetal, polyphenylene sulfide, polysulfone, an epoxy resin, a glass epoxy resin, a melamine resin, a phenol resin, a urea resin, an alkyd resin, a fluororesin, and polylactic acid; inorganic materials such as copper, steel, aluminum, silicon, soda glass, alkali-free glass, and indium tin oxide (ITO); and papers such as base paper, art paper, coated paper, cast coated paper, resin coated paper, and synthetic paper. In addition, the substrate may be composed of one layer or two or more layers. In a case where the substrate is composed of two or more layers, two or more substrates made of different materials may be laminated.

A form of the substrate is preferably sheet-like or film-like. A thickness of the substrate is preferably 20 to 2,000 μm.

The substrate may have an ink receiving layer, and a thickness of the ink receiving layer is preferably 1 to 20 μm. In a case where the thickness of the ink receiving layer is 1 to 20 μm, the ink receiving layer can be held more stably. The ink receiving layer means a coating layer formed on the substrate to absorb and fix the ink.

The substrate may be subjected to a pretreatment before the conductive ink is applied onto the substrate. Examples of the pretreatment include known methods such as an ozone treatment, a plasma treatment, a corona treatment, a primer treatment, and a roughening treatment.

The substrate may be an electronic board. In a case where the insulating layer and the conductive layer are arranged on the electronic board, the conductive layer functions as a so-called electromagnetic wave shield. Therefore, in a case where the insulating layer and the conductive layer are arranged on the electronic board, it is preferable that the insulating layer and the conductive layer are arranged so as to cover electronic components which can be included in the electronic board.

Here, the insulating layer is formed of a known insulating ink. In addition, the conductive layer is a conductive layer obtained by the manufacturing method of a conductive layer according to the embodiment of the present invention.

Examples of the electronic board include a flexible print substrate, a rigid print substrate, and a rigid flexible substrate.

It is preferable that the electronic board includes a wiring board and an electronic component disposed on the wiring board.

The wiring board refers to a member with a wiring line on the substrate and/or inside the substrate.

Examples of the substrate constituting the wiring board include a glass epoxy substrate, a ceramic substrate, a polyimide substrate, and a polyethylene terephthalate substrate. The substrate may have a monolayer structure or a multilayer structure.

The wiring provided on the wiring board is preferably a copper wiring. For example, one end of the wiring line is connected to an external power supply, and the other end is connected to a terminal of the electronic component.

Examples of the electronic component include a semiconductor chip, a capacitor, and a transistor.

(Curing Treatment)

The manufacturing method of a conductive layer according to the embodiment of the present invention may further include a curing treatment of performing at least one of heating or light irradiation on the deaerated conductive ink applied onto the substrate to cure the deaerated conductive ink applied onto the substrate. As a result, the deaerated conductive ink applied onto the substrate is cured to form a conductive layer.

Only one of the heating or the light irradiation may be performed, or both may be performed.

A temperature in a case of performing the heating (calcining temperature) is preferably 80° C. or higher, and more preferably 100° C. or higher. From the viewpoint of reducing damage to the substrate or the like, the calcining temperature is preferably 250° C. or lower and more preferably 200° C. or lower.

A time in a case of performing the heating (calcining time) is preferably 1 minute or longer. From the viewpoint of reducing damage to the substrate or the like, the calcining time is preferably 120 minutes or less and more preferably 60 minutes or less.

The substrate may be pre-heated before the conductive ink is applied onto the substrate. In the present invention, such heating is also regarded as one form of the above-described heating. A temperature of the substrate in a case of applying the conductive ink onto the substrate is preferably 20° C. to 180° C. and more preferably 40° C. to 150° C.

Specific examples of light in the light irradiation include ultraviolet rays and infrared rays.

A peak wavelength of the ultraviolet rays is preferably 200 to 405 nm, more preferably 250 to 400 nm, and still more preferably 260 to 400 nm.

An exposure amount in the light irradiation is preferably 0.1 to 10,000 $J/cm^2$ and more preferably 1 to 500 $J/cm^2$.

In the present invention, a time from a point in time at which the deaerated conductive ink is landed on the substrate until the heating or the light irradiation is started is preferably within 1 second, more preferably within 0.8 seconds, and still more preferably within 0.6 seconds. As a result, the reduction of the metal salt, the metal complex, or the metal particles, contained in the conductive ink which has landed on the substrate, to metal is promoted (that is, the reduction by oxygen in the air can be suppressed), so that a conductive layer having more excellent conductivity can be formed.

The conductive layer forming step may be repeated. As a result, a thickness of the conductive layer can be adjusted.

The thickness of the conductive layer is preferably 0.1 to 100 μm and more preferably 1 to 50 μm. The thickness of the conductive layer is an arithmetic average value obtained by acquiring a cross-sectional image of the conductive layer using a scanning electron microscope, measuring lengths at 10 different positions of a portion corresponding to the thickness of the conductive layer, and arithmetically averaging the 10 lengths.

From the viewpoint that the conductivity of the conductive layer is more excellent, a volume resistivity of the conductive layer is preferably 6 μΩ·cm or less, more preferably 5 μΩ·cm or less, and still more preferably 4 μΩ·cm or less.

The lower limit value of the volume resistivity of the conductive layer is not particularly limited, and is, for example, 2 μΩ·cm.

The volume resistivity of the conductive layer can be measured by a method described in the section of Examples later.

From the viewpoint that the conductivity of the conductive layer is more excellent, a void ratio of the conductive layer is preferably 24% or less, more preferably 23% or less, and still more preferably 22% or less.

The lower limit value of the void ratio is not particularly limited, and is, for example, 0%.

The void ratio of the conductive layer can be measured by a method described in the section of Examples later.

EXAMPLES

Hereinafter, the present invention will be described in more detail with reference to Examples. The materials, the amounts of materials used, the proportions, the treatment details, the treatment procedure, and the like shown in Examples below may be appropriately modified as long as the modifications do not depart from the spirit of the present invention. Therefore, the scope of the present invention should not be construed as being limited to Examples.

[Preparation of Conductive Ink 1]

570 g of silver neodecanoate was added to a 2000 mL three-neck flask. Next, 400.0 g of trimethylbenzene and 30.0 g of terpineol were added thereto and stirred, thereby obtaining a solution containing a silver salt. The solution was filtered using a membrane filter made of polytetrafluoroethylene (PTFE) having a pore diameter of 0.45 μm to obtain a conductive ink 1. The content of the metal contained in the conductive ink 1 ("Metal amount" in Table 1) was 22% by mass with respect to the total mass of the conductive ink 1, in terms of the metal element.

The conductive ink 1 was enclosed in an ink pack formed of an oxygen-impermeable material used in an ink jet recording device described below, 10 μL of the conductive ink 1 was taken out with a syringe, and the dissolved oxygen amount A (mg/L) in the conductive ink 1 at 25° C. was measured by a gas chromatography method (measuring instrument: GC390, manufactured by GL Sciences Inc.). The measurement results are shown in Table 1.

The above-described ink pack was obtained by heat-sealing a multilayer structural film in which polyamide, an aluminum alloy, polyethylene terephthalate, and polyolefin are laminated in this order into a bag shape, in which the polyolefin served as a liquid contact portion. In addition, an oxygen permeability of the ink pack was 0.5 cc/m$^2$·atm·24 hrs or less, and the ink pack was substantially impermeable to oxygen.

[Preparation of Conductive Inks 2 to 6]

The conductive ink 1 was diluted with a mixed solvent of trimethylbenzene and terpineol (trimethylbenzene:terpineol=40:3 (mass ratio)) such that the content of the metal in the conductive ink was a value shown in Table 1, thereby obtaining conductive inks 2 to 6.

For the conductive inks 2 to 6, bubbling or deaeration of oxygen was performed such that the value of the dissolved oxygen amount A (mg/L) was a value shown in Table 1. Thereafter, each conductive ink was enclosed in the above-described ink pack, and the dissolved oxygen amount A (mg/L) was measured by the same method as in the conductive ink 1. The measurement results are shown in Table 1.

Example 1

An ink jet recording device X equipped with a piezo-type ink jet head (product name "Samba", manufactured by FUJIFILM Dimatix, Inc.) was prepared.

An ink supply system in the ink jet recording device X included an ink pack, a supply pipe, a deaeration filter SEPAREL EF-G2 (manufactured by DIC Corporation), an ink supply tank immediately before an ink jet head, a deaeration filter (SEPAREL EF-G2, manufactured by DIC Corporation), and the ink jet head. An ink pack accommodating the conductive ink 1 was used as the above-described ink pack.

In a case of supplying the conductive ink 1 from the ink pack to the ink jet head, a pressure in a deaeration filter portion between the ink pack and the ink jet head was reduced such that the dissolved oxygen amount B (mg/L) of the conductive ink 1 was a value shown in Table 1 (deaeration step). The temperature of the conductive ink 1 in the deaeration step was 30° C.

Here, the dissolved oxygen amount B (mg/L) in Example 1 was the dissolved oxygen amount of the conductive ink 1 at 25° C., which was measured by extracting 10 μL of the conductive ink 1 with a syringe from the ink jet head side-flow passage downstream of the deaeration filter with a gas chromatography method (measuring instrument: GC390, manufactured by GL Sciences Inc.). The measurement results are shown in Table 1.

<Evaluation of Jetting Stability>

After the above-described deaeration step, the conductive ink having a dissolved oxygen amount B was continuously jetted from the nozzle of the ink jet head on a substrate (polyimide film, product name "KAPTON", manufactured by Du Pont-Toray Co., Ltd.), and the jetting stability of the ink was evaluated.

Specifically, the conductive ink having a dissolved oxygen amount B was jetted such that the amount of droplets jetted from the nozzle of the ink jet head was 2.5 pL, and the jetting was continuously performed for 15 minutes under the conditions of 128 nozzles and 20 kHz.

After the jetting, nozzle missing and defective nozzle were checked, and the jetting stability of the ink was evaluated according to the following evaluation standard. An evaluation standard of 3 or more is a level which does not cause any problems in practical use. The evaluation results are shown in Table 1.

(Evaluation Standard)

5: no nozzle missing and no defective nozzle
4: less than 3 of nozzle missing or defective nozzle
3:3 or more and less than 5 of nozzle missing or defective nozzle
2:5 or more and less than 10 of nozzle missing or defective nozzle
1:10 or more of nozzle missing or defective nozzle <Volume Resistivity (Conductivity Evaluation)>

After the above-described deaeration step, the conductive ink having a dissolved oxygen amount B was jetted from the nozzle of the ink jet head to print an image (size: 3 mm×20 mm) composed of the conductive ink on a surface of a substrate (polyimide film, product name "KAPTON", manufactured by Du Pont-Toray Co., Ltd.). The obtained image was heated on a hot plate at 180° C. for 30 minutes to obtain a substrate with a conductive layer, in which a conductive layer (thickness: 1 μm) was formed on the surface of the substrate (conductive layer forming step). The time from a point in time at which the conductive ink was landed on the substrate until the heating was started was within 1 second.

A resistance of the conductive layer was measured at room temperature (23° C.) using a resistance meter (trade name "DT4222", manufactured by HIOKI E. E. CORPORATION), a cross-sectional area of the conductive layer was measured at room temperature (23° C.) using a scanning electron microscope (product name S-4700, manufactured by Hitachi, Ltd.), and a volume resistivity (μΩ·cm) was calculated based on the obtained value. The evaluation standard is as follows, and as the volume resistivity is lower, the conductivity is more excellent. An evaluation standard of 2 is a level which does not cause any problems in practical use. The evaluation results are shown in Table 1.

(Evaluation Standard)

2: volume resistivity was 4μΩ·cm or less.

1: volume resistivity was more than 4μΩ·cm.

<Evaluation of Storage Stability>

The conductive ink before the deaeration step (that is, the conductive ink in which the dissolved oxygen amount A was the value shown in Table 1) was enclosed in the ink pack formed of the oxygen-impermeable material described above. The ink pack was stored in a constant-temperature tank kept at 45° C.; and then 100 μL of the conductive ink was taken out from a spout portion of the ink pack with a syringe, diluted 10 times with trimethylbenzene, and evaluated by measuring the absorbance at a wavelength of 240 to 800 nm with an ultraviolet-visible-infrared spectrophotometer V-550 (manufactured by JASCO Corporation). The evaluation standard is as follows, and an evaluation standard of 2 or more is a level which does not cause any problems in practical use. The evaluation results are shown in Table 1.

(Evaluation Standard)

4: change width Δ of the maximum value of the absorbance at a wavelength of 400 to 600 nm on the 45th day was less than 0.2.

3: no color change was observed until the 30th day, but a change width Δ of the maximum value of the absorbance at a wavelength of 400 to 600 nm on the 45th day was 0.2 or more.

2: no color change was observed until the 29th day, but a change width Δ of the maximum value of the absorbance at a wavelength of 400 to 600 nm on the 30th day was 0.2 or more.

1: change width Δ of the maximum value of the absorbance at a wavelength of 400 to 600 nm before the 29th day was 0.2 or more.

<Stability of Ink in Ink Jet Head (in-Head Stability)>

The conductive ink supplied to the ink jet head of the ink jet recording device X (that is, the conductive ink in which the dissolved oxygen amount B was the value shown in Table 1) was kept at 35° C., and 100 μL of the conductive ink was taken out from the ink jet head side-flow passage downstream of the deaeration filter with a syringe once a day, diluted 10 times with trimethylbenzene, and evaluated by measuring the absorbance at 240 to 800 nm with an ultraviolet-visible-infrared spectrophotometer V-550 (manufactured by JASCO Corporation). The evaluation standard is as follows, and an evaluation standard of 2 or more is a level which does not cause any problems in practical use. The evaluation results are shown in Table 1.

(Evaluation Standard)

3: change width Δ of the maximum value of the absorbance at a wavelength of 400 to 600 nm on the 10th day was less than 0.2

2: no color change was observed until the 9th day, but a change width Δ of the maximum value of the absorbance at a wavelength of 400 to 600 nm on the 10th day was 0.2 or more.

1: change width Δ of the maximum value of the absorbance at a wavelength of 400 to 600 nm before the 9th day was 0.2 or more.

<Void Ratio>

The substrate with a conductive layer produced in the measurement of the volume resistivity was cut using a microtome (product name RM2255, manufactured by Leica Biosystems Nussloch GmbH) in a thickness direction of the substrate with a conductive layer to obtain a cross section. Using a scanning electron microscope (product name S-4700, manufactured by Hitachi, Ltd.), a cross-sectional observation image of the obtained cross section were obtained.

The obtained cross-sectional observation image was adjusted for a threshold value using image software (manufactured by Adobe Systems, Inc., "Adobe Photoshop"), and was binarized into a white region where a conductive substance (metal) was present and a black region where a void was present in the conductive layer. A proportion of an area of the black region to the total area of the white region and the black region was calculated, and defined as a void ratio (%). The values of the void ratio (%) are shown in Table 1. As the void ratio is smaller, the conductive layer has more excellent conductivity.

Examples 2 to 7

The deaeration step of the conductive ink was performed in the same manner as in Example 1, except that the ink pack accommodating the conductive ink shown in Table 1 was used, and the pressure-reducing conditions were adjusted such that the dissolved oxygen amount B (mg/L) of the conductive ink after the deaeration step was the value shown in Table 1. Table 1 shows the dissolved oxygen amount B (mg/L) in each conductive ink after the deaeration step.

In addition, the various evaluations described above were performed by the same procedure as in Example 1. The evaluation results are shown in Table 1.

Comparative Example 1

The various evaluations described above were performed in the same manner as in Example 1, except that the deaeration step was not performed. The evaluation results are shown in Table 1.

In Comparative Example 1, although the deaeration step was not performed, for convenience, the value of the dissolved oxygen amount in the conductive ink supplied to the ink jet head is shown in the column of dissolved oxygen amount B in Table 1.

TABLE 1

| | | Example 1 | Example 2 | Example 3 | Example 4 | Example 5 | Example 6 | Example 7 | Comparative Example 1 |
|---|---|---|---|---|---|---|---|---|---|
| Conductive ink | Type | Conductive ink 1 | Conductive ink 2 | Conductive ink 2 | Conductive ink 3 | Conductive ink 4 | Conductive ink 5 | Conductive ink 6 | Conductive ink 2 |
| | Metal amount (% by mass) | 22.0 | 15.0 | 15.0 | 15.0 | 15.0 | 7.0 | 20.0 | 15.0 |
| | Dissolved oxygen amount A (mg/L) | 28.0 | 28.0 | 28.0 | 32.0 | 20.0 | 28.0 | 28.0 | 28.0 |
| | Dissolved oxygen amount B (mg/L) | 0.4 | 3.0 | 7.0 | 5.0 | 1.0 | 12.0 | 0.6 | 28.0 |
| | A − B (mg/L) | 27.6 | 25.0 | 21.0 | 27.0 | 19.0 | 16.0 | 27.4 | 0.0 |
| | Mm (mmol/L) | 1359.3 | 1158.5 | 1158.5 | 1158.5 | 1158.5 | 617.9 | 1324.0 | 1158.5 |
| | Mb (mmol/L) | 0.013 | 0.094 | 0.219 | 0.156 | 0.031 | 0.375 | 0.019 | 0.875 |
| | Mm/Mb | 108743 | 12357 | 5296 | 7414 | 37071 | 1648 | 70612 | 1324 |
| Jetting stability | | 5 | 5 | 5 | 5 | 5 | 3 | 5 | 1 |
| Storage stability | | 3 | 4 | 4 | 4 | 4 | 4 | 4 | 3 |
| In-head stability | | 2 | 3 | 3 | 3 | 3 | 3 | 3 | 3 |
| Volume resistivity | | 2 | 2 | 2 | 2 | 2 | 2 | 2 | 1 |
| Void ratio (%) | | 18 | 19 | 20 | 19 | 19 | 22 | 18 | 25 |

In Table 1, "A-B" indicates a value obtained by subtracting the dissolved oxygen amount B from the dissolved oxygen amount A.

In Table 1, "Metal amount" means a value (% by mass) obtained by converting the metal contained in the conductive ink into a metal element with respect to the total mass of the conductive ink.

Mm/Mb means a ratio of the molar concentration Mm (unit: mmol/L) of the metals in the conductive ink before the deaeration step to the molar concentration Mb (unit: mmol/L) of the dissolved oxygen in the deaerated conductive ink after the deaeration step, and calculation methods of Mm and Mb are as described above. However, in Comparative Example 1, since the deaeration step was not performed, a value corresponding to the molar concentration Mb was calculated using the conductive ink supplied to the ink jet head.

As shown in Table 1, in a case where the value obtained by subtracting the dissolved oxygen amount B in the deaerated conductive ink after the deaeration step from the dissolved oxygen amount A in the conductive ink before the deaeration step (A-B) was larger than 15 mg/L, it was shown that the storage stability and jetting stability of the ink were excellent, and a conductive layer having excellent conductivity could be formed (Examples).

In addition, from the comparison of Examples 1 to 7, in a case where the value of Mm/Mb was in a range of 1,700 to 100,000, it was shown that both the in-head stability and jetting stability were more excellent (Examples 2 to 5 and 7).

What is claimed is:

1. A manufacturing method of a conductive layer, comprising:

a deaeration step of deaerating a conductive ink accommodated in an ink container; and a conductive layer forming step of, with an ink jet recording method, applying the deaerated conductive ink onto a substrate by jetting the deaerated conductive ink from a nozzle to form a conductive layer, wherein the conductive ink contains at least one material selected from the group consisting of a metal salt, a metal complex, and metal particles, and in a case where a dissolved oxygen amount in the conductive ink before the deaeration step is denoted as a dissolved oxygen amount A and a dissolved oxygen amount in the deaerated conductive ink after the deaeration step is denoted as a dissolved oxygen amount B, a value obtained by subtracting the dissolved oxygen amount B from the dissolved oxygen amount A is larger than 15 mg/L.

2. The manufacturing method of a conductive layer according to claim 1, wherein the dissolved oxygen amount B is 10 mg/L or less.

3. The manufacturing method of a conductive layer according to claim 1, wherein a metal constituting the metal salt, the metal complex, and the metal particles includes at least one of silver or copper.

4. The manufacturing method of a conductive layer according to claim 1, wherein the conductive ink contains at least one of the metal salt or the metal complex.

5. The manufacturing method of a conductive layer according to claim 1, wherein, in a case where a molar concentration of metals in the conductive ink is denoted as Mm and a molar concentration of dissolved oxygen in the deaerated conductive ink after the deaeration step is denoted as Mb, a value of Mm/Mb is 1,700 to 100,000, provided that units of Mm and Mb are both mmol/L.

6. The manufacturing method of a conductive layer according to claim 1, wherein the conductive layer forming step includes a curing treatment of performing at least one of heating or light irradiation on the deaerated conductive ink applied onto the substrate to cure the deaerated ink applied onto the substrate, and a time from a point in time at which the deaerated ink is landed on the substrate until the heating or the light irradiation is started is within 1 second.

7. The manufacturing method of a conductive layer according to claim 1, wherein a temperature of the conductive ink in a case of performing the deaeration step is 30° C. or higher.

8. The manufacturing method of a conductive layer according to claim 2, wherein a metal constituting the metal salt, the metal complex, and the metal particles includes at least one of silver or copper.

9. The manufacturing method of a conductive layer according to claim 2, wherein the conductive ink contains at least one of the metal salt or the metal complex.

10. The manufacturing method of a conductive layer according to claim 2, wherein, in a case where a molar concentration of metals in the conductive ink is denoted as Mm and a molar concentration of dissolved oxygen in the deaerated conductive ink after the deaeration step is denoted as Mb, a value of Mm/Mb is 1,700 to 100,000, provided that units of Mm and Mb are both mmol/L.

11. The manufacturing method of a conductive layer according to claim 2, wherein the conductive layer forming step includes a curing treatment of performing at least one of heating or light irradiation on the deaerated conductive ink applied onto the substrate to cure the deaerated ink applied onto the substrate, and a time from a point in time at which the deaerated ink is landed on the substrate until the heating or the light irradiation is started is within 1 second.

12. The manufacturing method of a conductive layer according to claim 2, wherein a temperature of the conductive ink in a case of performing the deaeration step is 30° C. or higher.

13. The manufacturing method of a conductive layer according to claim 3, wherein the conductive ink contains at least one of the metal salt or the metal complex.

14. The manufacturing method of a conductive layer according to claim 3, wherein, in a case where a molar concentration of metals in the conductive ink is denoted as Mm and a molar concentration of dissolved oxygen in the deaerated conductive ink after the deaeration step is denoted as Mb, a value of Mm/Mb is 1,700 to 100,000, provided that units of Mm and Mb are both mmol/L.

15. The manufacturing method of a conductive layer according to claim 3, wherein the conductive layer forming step includes a curing treatment of performing at least one of heating or light irradiation on the deaerated conductive ink applied onto the substrate to cure the deaerated ink applied onto the substrate, and a time from a point in time at which the deaerated ink is landed on the substrate until the heating or the light irradiation is started is within 1 second.

16. The manufacturing method of a conductive layer according to claim 3, wherein a temperature of the conductive ink in a case of performing the deaeration step is 30° C. or higher.

17. The manufacturing method of a conductive layer according to claim 4, wherein, in a case where a molar concentration of metals in the conductive ink is denoted as Mm and a molar concentration of dissolved oxygen in the deaerated conductive ink after the deaeration step is denoted as Mb, a value of Mm/Mb is 1,700 to 100,000, provided that units of Mm and Mb are both mmol/L.

18. The manufacturing method of a conductive layer according to claim 4, wherein the conductive layer forming step includes a curing treatment of performing at least one of heating or light irradiation on the deaerated conductive ink applied onto the substrate to cure the deaerated ink applied onto the substrate, and a time from a point in time at which the deaerated ink is landed on the substrate until the heating or the light irradiation is started is within 1 second.

19. The manufacturing method of a conductive layer according to claim 4, wherein a temperature of the conductive ink in a case of performing the deaeration step is 30° C. or higher.

20. The manufacturing method of a conductive layer according to claim 5, wherein the conductive layer forming step includes a curing treatment of performing at least one of heating or light irradiation on the deaerated conductive ink applied onto the substrate to cure the deaerated ink applied onto the substrate, and a time from a point in time at which the deaerated ink is landed on the substrate until the heating or the light irradiation is started is within 1 second.

* * * * *